United States Patent
Crost et al.

[11] 4,000,419
[45] Dec. 28, 1976

[54] APPARATUS FOR ADDING ELECTRONIC DISPLAY INFORMATION TO A NIGHT VISION GOGGLE DISPLAY

[75] Inventors: Munsey E. Crost, Neptune; Joseph A. Dasaro, Freehold; Irving Reingold, Deal; Norman K. Shupe, Wanamassa, all of N.J.

[73] Assignee: The United States of America as represented by the Secretary of the Army, Washington, D.C.

[22] Filed: Sept. 26, 1975

[21] Appl. No.: 617,205

[52] U.S. Cl. .......................... 250/213 VT; 250/227; 250/330; 356/13
[51] Int. Cl.² ......................................... H01J 31/50
[58] Field of Search ........ 250/216, 213 R, 213 VT, 250/330, 333, 227; 356/12, 13, 247

[56] References Cited
UNITED STATES PATENTS

| | | | |
|---|---|---|---|
| 3,205,303 | 9/1965 | Bradley | 250/216 |
| 3,463,879 | 8/1969 | Miyashiro | 250/213 VT |
| 3,633,988 | 1/1972 | Farrar | 356/247 |
| 3,833,300 | 9/1974 | Rymes | 356/13 |

Primary Examiner—David C. Nelms
Attorney, Agent, or Firm—Nathan Edelberg; Sheldon Kanars; Daniel D. Sharp

[57] ABSTRACT

The described apparatus employs the image intensifier tube assemblies of night vision goggles for nighttime viewing, but bypasses one of these assemblies in additionally injecting pictorial or electronically generated information at a comfortable light level.

9 Claims, 5 Drawing Figures

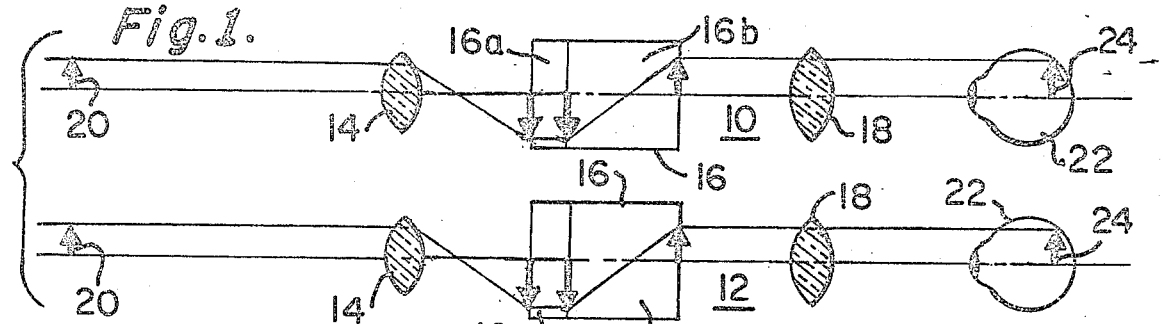
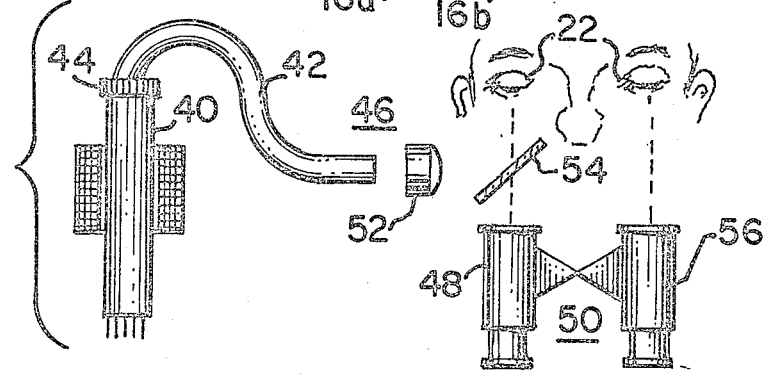
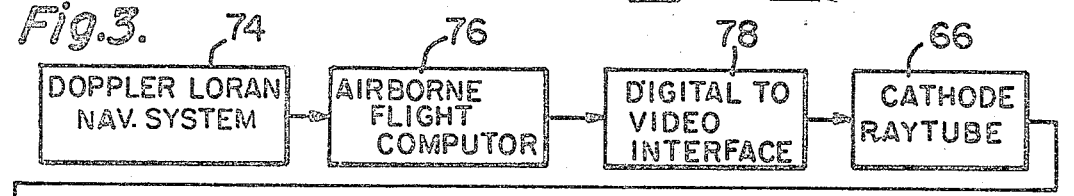
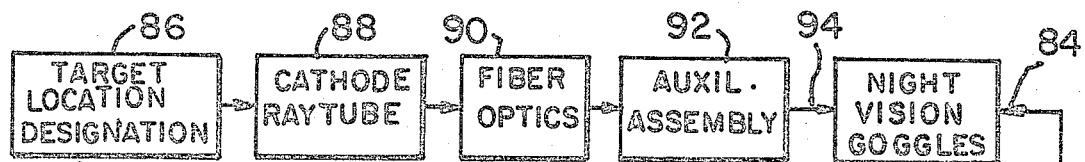
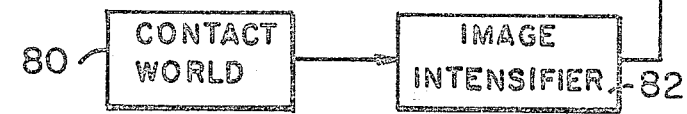
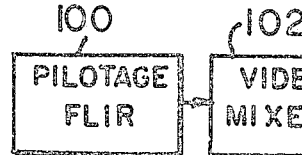
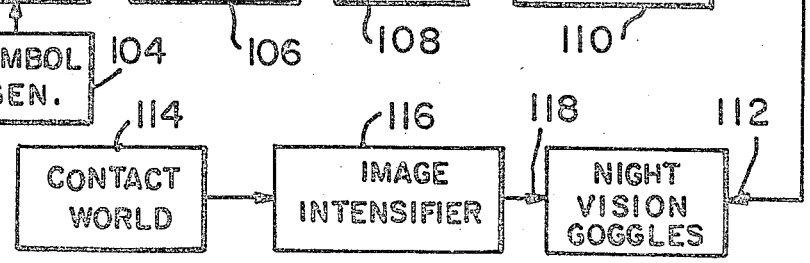

APPARATUS FOR ADDING ELECTRONIC DISPLAY INFORMATION TO A NIGHT VISION GOGGLE DISPLAY

The invention described herein may be manufactured and used by or for the Government for governmental purposes without the payment of any royalties thereon or therefor.

FIELD OF THE INVENTION

This invention relates to night vision goggles and, more particularly, to apparatus for adding electronic display information to a night vision goggle display so that outside scene and electronically generated informations can be viewed substantially simultaneously, or alternately, if desired, without removing the goggles.

BACKGROUND OF THE INVENTION

As is well known and understood, night vision goggles are often used in military applications with helicopters operating by moonlight or starlight. Such goggles contain two monocular assemblies, each having an objective lens, an image intensifier tube assembly, and an eyepiece — with the objective lens receiving the available light input and imaging it onto the intensifier tube for amplification to a level at which the user can view it through the eyepiece. However, because the goggles are generally of a fixed focal length, difficulties have been experienced by the wearer in switching focus from an outside scene to an instrument panel or to a hand-held map, for example, in a helicopter cockpit. Discarding the goggles for such close viewing as the latter is not generally acceptable, because without the goggles, the instrument panel, map, etc., must first be illuminated for direct viewing, and such illumination can, in fact, be visually detected by enemy forces. While the use of bifocal lenses on the night vision goggles provides some solution to the focus problem, it is achieved at the expense of reducing the available lens area providing the desired field-of-view, and the depth of field is restricted within narrow limits.

SUMMARY OF THE INVENTION

As will become clear hereinafter, the apparatus of the present invention permits adding electronic display information (e.g., map, instrument panel, target reticle) on the field-of-view seen through the night vision goggle display. The electronically generated information may be initially displayed on a remotely located cathode-ray tube having a fiber-optic face-plate, and then transmitted by a detachable, fiber-optic conduit to be injected at one of the monocular eyepieces of the night vision goggles, bypassing its associated image intensifier assembly. An additional lens is incorporated at the end of the conduit closest to the goggles, in order to magnify the image provided along the conduit, and to place it at infinity with respect to the eye. In one version of the invention, a semi-transparent mirror or beam-splitting prism can be used at the eyepiece of the monocular assembly to permit super-position of the auxiliary generated information on the object scene. In an alternative embodiment, a right-angled reflecting prism is employed where super-position of images is not required. In either configuration, detent mechanisms may be employed so as to slide the mirror or prism out of the goggle structure when only the outside scene is to be viewed.

BRIEF DESCRIPTION OF THE DRAWING

These and other features of the present invention will be more clearly understood from a consideration of the following description, taken in connection with the accompanying drawing, in which:

FIG. 1 is a schematic diagram of the optical system of a known pair of night vision goggles;

FIG. 2 is a schematic diagram illustrating the concept of electronic data image injection into the night vision goggles in accordance with the invention; and FIGS. 3–5 illustrate system configurations in which the apparatus of the present invention is particularly useful.

DETAILED DESCRIPTION OF THE DRAWING

The night goggle optical system of FIG. 1 (not to scale) contains two monocular assemblies 10, 12, each having an objective lens 14, an image intensifier tube 16, and an eyepiece 18. The objective lens 14 is of fixed focal length, and provides a real inverted image of an outside scene 20 at the input of the image intensifier portion 16a of the tube 16. The intensifier portion a amplifies the image of moonlight or starlight level, and presents it as such to the rotator portion 16b of the intensifier tube 16. Such rotator portion 16b may be a fiber-optic bundle that has been twisted 180° in manufacture to compensate for the inversion of the objective lens 14 and to provide the image in correct orientation for viewing by the eye 22. The image output of the rotator portion 16b is magnified by the eyepiece 18, which is selected to provide an image 24 at infinity with the same angular subtense at the eye as the outside scene 20.

The night vision goggles are typically strapped to a pilot's or copilot's head, under the lip of the helmet being worn, and are not intended to be continually removed and then replaced. Because the objective lens 14 is of a fixed focal length, difficulties in focusing have been encountered if the object scene 20 were at one time a different object (outside a helicopter cockpit, for example), at another time an instrument panel located at a closer, but fixed distance away, or a map which is being moved back and forth for best viewing.

The schematic diagram of FIG. 2 illustrates a modification of the night vision goggles in order to provide additional information injection — e.g., map information, instrument-panel readings, target reticles, symbology — and in a manner wherein the internal workings of the goggles are changed as little as possible. Before considering such modification, however, it will be understood that a possible alternative, (i.e., constructing a semi-transparent mirror and/or prism arrangement to superimpose pictorial or electronically generated information onto the outside scene in front of the objective lens 14), suffers from the disadvantage that although the weight of the added components may be small, the large moment-arm established with respect to the head of the wearer will increase an already heavy strain produced upon the neck muscles because of the weight of the goggles themselves. Also, some sensitivity would be lost because of the attenuation characteristics of the semi-transparent mirror in superimposing the two informations, and it presents the possibility that the auxiliary image illumination might be detected from the outside. Although the mechanism for superposition of the auxiliary information can be added to the goggles in simple manner, this suggested modification suffers the further disadvantage that if the electronic circuitry or the image-tube in the night vision goggles were to fail, the external scene and the auxiliary informations would both be lost — the only way a pilot could then fly the aircraft would be for him to remove the goggles, so as to be able to see, but at the same time putting him in a low-light-level environment where his perception would be extremely poor.

The apparatus of the present invention, on the other hand, modifies the night vision goggle construction by injecting the pictorial or electronically generated information after the eyepiece 18, thereby bypassing the electronic workings of the goggles. If the electronics of the goggles were then to fail, symbology information could be retained — and could serve as a navigational aid, for example, if it were in the form of a map having computer input information showing the location and heading of the aircraft on the display. Besides providing a means of controlled navigation in a nighttime environment in such instance, the apparatus also suffers the advantage of reduced muscle strain consistent with a decreased moment-arm. Additionally, the auxiliary information can be provided at a higher light intensity at the output of the intensifier tube, thereby permitting more flexible operation of the symbol generation equipment, which otherwise would have to be operated at low levels were the information inserted at the input end, in order to prevent saturation of the intensifier-tube display.

In the schematic diagram of FIG. 2, a high resolution cathode-ray tube 40, is shown, having a fiber-optic faceplate and a high-brightness, green-fluorescent phosphor, such as P31 or P45. One end of a fiber-optic conduit 42 is mounted in direct contact with the faceplate, whereas the other end is fixedly secured to a barrel assembly 46 arranged to attach to the right monocular assembly 48 of the night vision goggle 50. The phosphor for the faceplate is selected of a fluorescence to match, as closely as possible, the fluorescence of the image intensifier tube of the goggles 50, while a fiber-optic faceplate is employed to eliminate the need for a relay, or transfer, lens to focus the image of the cathode-ray tube onto the conduit fibers, with the consequent light attenuation which results and the additional space required.

Although not shown, it will be understood that conventional video generating and processing circuits are used with the cathode-ray tube 40 to provide the pictorial or electronic image display to be added to the object scene. In one arrangement of the apparatus, a fiber-optic conduit of 8 by 10 millimeter image format is employed, having some 675,000 fibers of 10 micrometer diameter each. A lightweight armored, but flexible, shield surrounds the conduit 42, selected of some 4 feet in length.

In the barrel assembly 46, a further lens 52 and a reflecting means 54 (here shown as a flat mirror) are included. The fiber-optic conduit 42 is rigidly attached in accurate orientation to this assembly, comparable to the rigidly secure orientation of the conduit 42 to the cathode-ray tube faceplate. The added lens 52 is similar in function to the eyepiece 18 of FIG. 1, to magnify the image at the end of the fiber-optic conduit 42 and to focus it at infinity. Preferably, the auxiliary barrel assembly 46 may be attached, by way of a key locator, to a quick-disconnect type socket on the right assembly 48 of the goggles 50.

In particular, the auxiliary barrel 46 connects to the right assembly 48 so as to insert the reflecting means 54 between its eyepiece 18 and the eye 22. To this end, the eyepiece 18 is selected of an eye-relief space sufficiently long to permit the right angle reflecting reflecting means 54 to be inserted, or removed, from behind the eyepiece lens. Thus, for the special application of image injection with night vision goggles, it is important that there be sufficient space for the eye-lens system in which modifications can be made to provide auxiliary information injection, without modifying the internal workings of the night vision goggles. In one adaptation of the present invention, where auxiliary information is to be viewed superimposed on the image of object scene seen through the goggles, available AN/PVS-5 night vision goggles can be modified to insert a reflecting means 54 in the form of a partially reflecting, partially transmitting, semi-transparent mirror or prism. If a prism is used, it must be a beam-splitting prism for this adaptation.

In another adaptation of the present invention, available AN/PVS-5 night vision goggles were modified to insert an eyepiece of greater eye-relief distance than employed in normal usage, 25mm instead of 17mm, — the "eye-relief" distance being understood as that space between the rear of the eyepiece 18 and the front surface of the eye 22 within which an entire field of view of the optical system can be seen, without vignetting or any substantial cutting-off of the outer portions of the image. A slide lever, or other appropriate detent mechanism, is employed to move the reflecting means 54 into the optical path of the right assembly 48 to permit, at such time, viewing of the injected image. The reflecting means used here is a totally reflecting mirror or totally reflecting prism, instead of a partially reflecting, partially transmitting, semi-transparent mirror, so that only auxiliary image information will be seen through the right eye when the auxiliary barrel 46 is operative. The use of a totally reflecting prism further provides an optical effect which increases the eye-relief distance and permits additional optical modifications without deleteriously affecting the ultimate image visible to the eye. More particularly, by inserting a prism of dense optical material having an index of refraction greater than 1.0, the exit pupil can be moved further back towards the eye, by a distance which depends upon the specific index of refraction of the material employed.

Another feature of the present invention is the added inclusion of a similar block of optically dense material inserted permanently in the optical path of the left assembly 56, through which the outside scene continues to be viewable. Thus, with the prism 54 in place, the effective eye-relief distance will be the same for the auxiliary information viewed through the auxiliary assembly 46 and for the object scene viewed through the left assembly 56. Additionally, the prism detent arrangement can be such that if the object scene were to be viewed through the right assembly 48 without any pictorial information — i.e., with the prism 54 out of the optical path —, the mechanisms can be configured to insert a second optically dense material between the eyepiece 18 and the eye 22 viewing through the right assembly 48 so that the eye-relief distance will continue to be the same for both right and left optical paths. Alternatively, if it should become disturbing to view scene information through the left assembly 56 with pictorial information viewed through the auxiliary barrel 46, then the prism-slide mechanism, when activated, could be such as to shutter the left assembly 56 by means of an additional attachment in order to block the left assembly view at that time.

In actual operation, the cathode-ray tube 40 can be mounted anywhere within the helicopter cockpit — at a back wall, for example — with the conduit 42 then being snaked over to a mounting frame on the night vision goggles, the conduit being physically supported in part at some point within the cockpit. In order for the conduit 42 to enter at the proper angle to the objective lens 18 of the right assembly 48, the conduit 42 must be securely and reliably oriented; alternatively, an additional lens and mirror could be employed to provide a right angle turn for the injection so as to provide flexibility in the manner by which the conduit is supported and connected. In the operation of the apparatus, 1a brightness control for the image may be provided on the cathode-ray tube itself, or on the night vision goggle mounting, conveyed via low voltage means to the cathode-ray tube along electrical wirings strung along with the conduit 42. A rotatable polaroid filter attenuator might be employed instead, although it suffers the disadvantage of discarding half the available light at maximum transmission. A variable-aperture iris-diaphragm at an out-of-focus location in the optical path may alternatively be employed.

The arrangements of FIGS. 3-5 illustrate manners in which the apparatus of the present invention could be utilized. In FIG. 3, the contact-world object scene 60 is applied via the image intensifier optics of the night vision goggle 62 to the left assembly eyepiece 64, while the cathode-ray tube information displayed at 66 is coupled by the fiber-optic bundle 68 and the auxiliary barrel 70 to the eye, injected after the right assembly eyepiece 72. An appropriate navigation system 74, Doppler/Loran, for example, provides coordinate information to an airborne flight computer 76, which provides target reticle, map, or symbology information in digital form to be converted, via a digital-to-video interface 78, for display on the cathode-ray tube 66. Aircraft heading information, obtained from a directional gyroscope (or from other appropriate terminal equipment) provides a modification to the computer generated display, in order to portray an accurate picture not only as to aircraft position but as to direction, as well. Thus, if the computer were generating a map of upcoming terrain, the aircraft heading information provides a correlation as to the direction the aircraft is moving. In this arrangement, the cathode-ray tube display might be of the size of a 16mm movie slide, so that magnification at the end of the fiber-optic bundle 68 is necessary, and is provided by the afore-described lens which also focuses the image at infinity.

In the arrangement of FIG. 4, the contact-world object scene 80 is again transmitted to the left assembly eyepiece 84 by means of the image intensifier optics 82. A target location/designation system, e.g. radar, 86 provides the primary information flow, via the cathode-ray tube 88, the fiber-optic bundle 90, and the auxiliary barrel 92, to the eye after the right assembly eyepiece 94. This arrangement is particularly attractive for use by the copilot of the aircraft, in that it presents a capability for his quick reaction transition to the contact-world outside the aircraft should the pilot be injured. With this arrangement the copilot can quickly assume the pilotage responsibility.

The arrangement of FIG. 5 shows a similar display concept, for use by the pilot, himself. Here, the pilotage information can be provided by a forward-looking infrared detection system 100, for example, for mixing with electronically generated instrument panel, map, for target-reticle information via a video mixer 102, as supplied from a symbology type generator 104. The cathode-ray tube 106, the fiber-optical bundle 108, and the auxiliary barrel 110 convey this information to the eye, being injected after the right assembly eyepiece 112, to be viewed along with the contact-world scene 114 coupled via the intensifier optics 116 to the left assembly eyepiece 118. As with FIG. 4, the image-intensifier path 116 could thus serve as a quick-reaction backup mode to a pilot in the event his infrared navigational system should fail.

While there has been described what is considered to be a preferred embodiment of the present invention, it will be readily understood that modifications may be made by those skilled in the art without departing from the scope of the teachings herein of providing auxiliary information into a night vision goggle setup, in a convenient manner, yet without modifying the internal workings of the goggles to any significant extent, if at all. For example, it will be seen that the reflecting prism 54 of FIG. 2 might be replaced in the auxiliary barrel assembly 46 by a semitransparent mirror, so as to provide a superposition of the auxiliary image information with the outside scene viewed through the right assembly 48 of the night vision goggles 50. With the configuration of FIG. 2, on the other hand, it becomes permissible to cycle back and forth between auxiliary information and scene information, and at a controllable rate, if desired. For these reasons, the scope of the invention is to be viewed in light of the claims appended hereto.

I claim:

1. In combination: a pair of night vision goggles of the type used to view an object scene of low light-intensity and containing two monocular assemblies, each having in the optical path thereof an objective lens, an image intensifier tube assembly, and an eyepiece lens; and
    means for viewing auxiliary information in addition to said object scene and including reflecting means for selectively injecting the auxiliary information at a position in said optical path of said night vision goggles subsequent to the eyepiece of at least one of said two monocular assemblies.

2. The apparatus of claim 1 wherein said reflecting means is totally reflective.

3. The apparatus of claim 2 wherein said reflecting means includes a right-angled reflecting prism for blocking the optical path through said one of said two monocular assemblies with which said prism is operative.

4. The apparatus of claim 3 wherein said reflecting means further includes means for inserting an optical material into the optical path of the other said two monocular assemblies of index of refraction substantially equal to that of said reflecting prism.

5. The apparatus of claim 1 wherein said viewing means includes display-tube means at which the auxiliary information is first generated for viewing and fiber-optic conduit means for coupling said display-tube image for injection at said optical-path position of the night vision goggles.

6. The apparatus of claim 5 wherein said display tube means includes a cathode-ray tube having a fiber-optic faceplate, which is contact-coupled to the fiber-optic conduit.

7. The apparatus of claim 6 wherein lens means are included to magnify the displayed image coupled via said fiber-optic conduit means, and to focus said image at infinity.

8. The apparatus of claim 5 wherein said display tube means includes a cathode-ray tube having a fiber-optic faceplate and wherein a transfer lens is included to project the image from said faceplate upon said fiber-optic conduit means.

9. The apparatus of claim 1 wherein said injecting means includes a semi-transparent reflecting means operative to inject the auxiliary information at a point subsequent to the eyepiece of one of said monocular assemblies, and before the eyes of the person viewing said object scene, so that the auxiliary information is viewed superimposed on the image of the object scene seen through the goggles.

* * * * *